July 23, 1935.                W. A. SCHEURER                2,009,363
                              POCKET LETTER SCALE
                              Filed Jan. 26, 1935

INVENTOR.
William A. Scheurer.
BY
Corbett & Mahoney
ATTORNEYS.

Patented July 23, 1935

2,009,363

UNITED STATES PATENT OFFICE 2,009,363

POCKET LETTER SCALE

William A. Scheurer, Columbus, Ohio, assignor to The Exact Weight Scale Company, Columbus, Ohio, a corporation of Ohio Application January 26, 1935, Serial No. 3,620

4 Claims. (Cl. 265—63)

My invention relates to a pocket letter scale. It has to do, more particularly, with a scale which is adapted to be used particularly for weighing letters or other small articles to determine the amount of postage required for mailing such letters or articles. It is of such a nature that it may be conveniently carried in the pocket.

There have been several scales of the general type indicated devised in the past. These prior art scales have sometimes taken the form of a fountain pen or pencil. However, all of such devices have been possessed of certain undesirable features. Some of the prior art devices have been complicated in nature and difficult to assemble and, consequently, have been expensive to manufacture. Also, in prior art scales of this general type there have been no means for effectively adjusting the resistance of the resistance element which usually takes the form of a spring. Also, other desirable adjustments, such as the accurate initial positioning of the zero mark on the scale relative to an indicating point, could not be obtained in prior art scales of this general type. Another disadvantage of some of the prior art scales of this type resides in the fact that they have been of such a structure as to permit dirt or dust to reach the operating mechanism thereof and thereby affect the accuracy of the scale.

One of the objects of my invention is to provide a letter scale which has the appearance of a fountain pen or a pencil and which may be readily and conveniently carried in the pocket.

Another object of my invention is to provide a pocket letter scale which is of very simple construction, has a minimum number of parts, which can be manufactured at a low cost and which can be easily assembled.

Another object of my invention is to provide a pocket letter scale wherein the resistance element may be readily adjusted in order to vary the resistance thereof so that accuracy may be imparted to the scale and which may be adjusted to accurately position the zero point of the weight indicating mechanism relative to an indicating point.

Another object of my invention is to provide a scale of the type indicated wherein the operating mechanism is completely enclosed and is fully protected.

The preferred embodiment of my invention is illustrated in the accompanying drawing wherein similar characters of reference designate corresponding parts and wherein.

Figure 1:
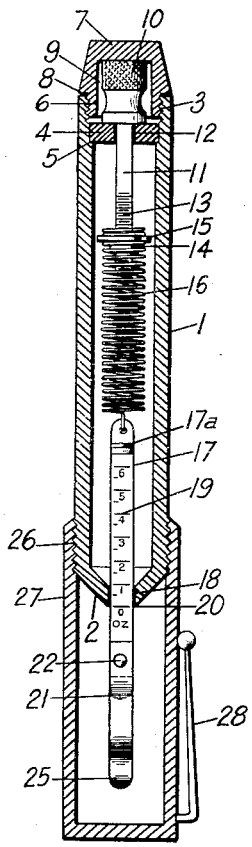
Figure 1 is a vertical section taken through the pocket scale made in accordance with my invention.
Figure 2:
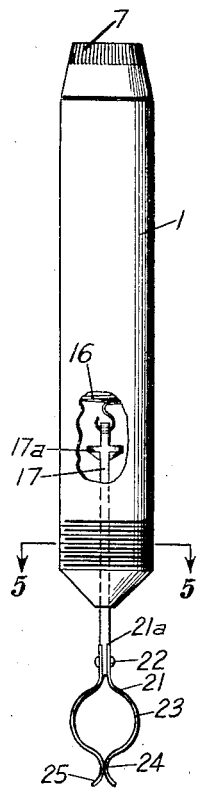
Figure 2 is a side elevation, partly broken away, of the main portion of the container or housing of the scale with the cap removed therefrom.

With reference to the drawing, I have shown my pocket scale constructed in such a manner that it has the appearance of a fountain pen. This scale embodies a main housing 1 of substantially cylindrical form which is preferably made of molded plastic material although it may be made of other suitable material. The upper end of this cylindrical housing is open (Figure 1) but the lower portion of the wall thereof converges, as indicated at 2, and substantially closes the lower end thereof.

The inner surface of the wall of the cylindrical housing 1 is threaded at its upper end as indicated at 3. The threads terminate at a point spaced a substantial distance within the end of the housing. A washer 4 is inserted in the end of housing 1 and rests against a shoulder 5 formed adjacent the end of the housing. Thus, the washer will be spaced within the end of the housing as indicated in Figure 1.

The threaded portion 3 at the upper end of the housing is also adapted to receive a reduced portion 6 which has its outer surface threaded and which is formed on the lower end of a cap member 7. The outer portion of this cap member is of substantially frusto-conical form. Because of the reduced portion 6 a shoulder 8 is formed thereon which limits inward movement of the cap relative to the housing. The cap 7 has a chamber 9 of substantially cylindrical form produced therein.

Figure 6:
Figure 6 is a perspective view of the nut which cooperates with the resistance spring.

The chamber 9 is adapted to receive a knurled knob 10 which is formed or keyed on the upper end of a screw 11. When the cap 7 is positioned properly on the end of the housing, it contacts with the end of knob 10 and normally prevents rotation thereof. The screw 11 passes down through an opening 12 disposed centrally within the washer 4. The screw 11 may rotate in the opening 12. The lower end of knob 10 will rest on the upper surface of washer 4 as indicated in Figure 1. The lower portion of the screw 11 is threaded for a substantial distance as indicated at 13. The threaded portion 13 is adapted to receive a threaded nut 14. The threaded nut 14 has ears 15 projecting from the periphery thereof at diametrically opposed points (Figure 6). The upper end of a tension spring 16 of helical form surrounds the nut 14 and the ears 15 project outwardly through the space between convolutions thereof.

Figure 5:
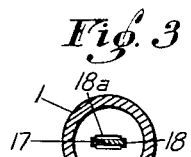
Figure 5 is a section taken substantially on line 5—5 of Figure 2, showing the shape of the opening in the housing through which the indicator strip passes.

The lower end of the spring 16 has a calibrated strip 17 suspended therefrom which is preferably made of the same material as housing 1. This calibrated strip 17 is preferably rectangular in cross section and extends downwardly through an opening 18 in the extreme lower end of the housing 1 (Figure 5). The strip 17 is free to slide in opening 18 but cannot rotate therein. The side edges of opening 18 are preferably recessed as at 18a to reduce sliding friction between the edges of the opening and the strip 17 to a minimum. The calibrations 19 on the strip are preferably in ounces and are adapted to cooperate with the lower edge 20 of opening 18 to indicate the weight of a letter or other article. As will be explained later, the zero mark of the calibrations is initially positioned at the point 20. The calibrations or marks on strip 17 are preferably indented therein and filled with enamel of a different color than housing 1 so they will be visible readily.

The lower end of the strip 17 has a pair of cooperating spring clips 21 which are preferably riveted thereto as at 22. Each of the clips 21 is bowed as at 23 and when both of the clips are disposed in cooperative relation they contact at a point 24. However, the extreme lower ends of the clips diverge as indicated at 25 so that a letter may be readily inserted therebetween. When a letter is inserted between the spring clips it will be automatically gripped by such clips. At the point where the upper ends of spring clips 21 are attached to strip 17, the strip is recessed on both sides in order that shoulders 21a are formed which cooperate with the upper ends of members 21 to prevent swinging of such members around the rivet. The upper end of the calibrated strip 17 has a stop 17a which will limit downward movement of the strip relative to the housing. This stop 17a is similar in shape to that of the lower end of the housing with which it contacts to limit downward movement of strip 17.

The outer surface of the housing 1 is threaded adjacent its lower end as indicated at 26. This threaded portion 26 is adapted to receive a cooperatively threaded portion formed on the inner surface and adjacent the open end of a substantially cylindrical cap member 27. The lower end of the cap member 27 (Figure 1) is closed. This cap member is adapted to completely enclose the spring clips 21 and the portion of the strip 17 which projects from the lower end of the housing 1. The cap 27 is provided with a spring clip 28 of a suitable type for holding the letter scale in the pocket when it is properly positioned therein.

It will be apparent from Figure 1 how the scale may be readily assembled. The tension of the spring 16 may be initially adjusted so that it will have the proper resistance in order that the scale will weigh accurately. The tension of the spring may be readily varied by rotating the spring bodily relative to the nut 14. This will increase or decrease the effective length of the spring and will, consequently, vary the resistance thereof. The spring will be retained in adjusted position by friction between ears 15 of nut 14 and the convolutions of spring 16. The resistance of the spring may be initially adjusted at the plant or shop where the unit is made and under ordinary conditions no further adjustment thereof will be necessary.

The knurled knob 10 is provided so that the zero mark on the calibrated strip 17 may be accurately positioned at the point 20 which is the extreme lower edge of the opening 18 in the lower end of housing 1. When the cap 7 is removed the knurled knob 10 may be readily rotated. Since the strip 17 is of rectangular form and the opening 18 is of similar shape, rotation of the strip 17 and, consequenty, the spring 16, will be precluded upon rotation of knob 10 and rotation of nut 14 will be precluded by friction. Therefore, the screw 11 will thread farther through or be retracted farther from the nut 14. Consequently, the strip 17 will be raised or lowered and the zero mark thereon may be accurately positioned at the point 20. The cap 7 will normally be in position on the housing and will contact with the upper surface of knob 10 to prevent rotation thereof.

Figure 3:
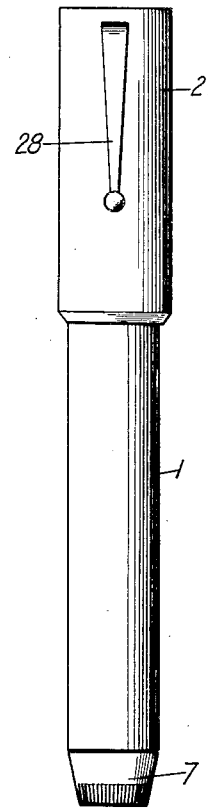
Figure 3 is a side elevation of my pocket scale showing the cap in position so that the scale is ready to be positioned in the pocket.
Figure 4:
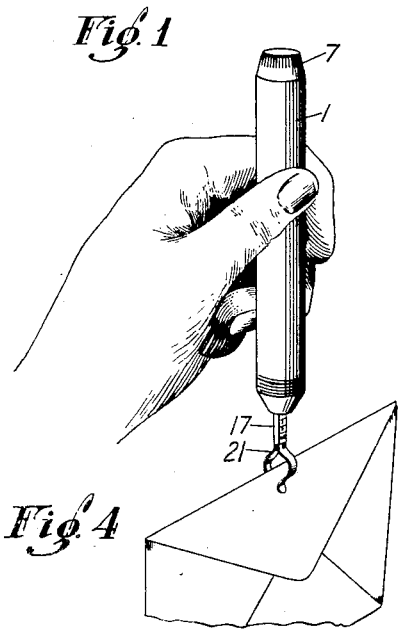
Figure 4 is a perspective view of the scale showing how it may be used in weighing a letter.

When it is desired to place this scale in the pocket the cap 27 will be threaded in place and the scale will resemble a fountain pen as indicated in Figure 3. When it is desired to use this scale the cap 27 is removed and the housing 1 may be held as indicated in Figure 4. Although the cap is not shown in this figure, it may be slipped over the upper end of the body portion 1 and be supported thereon during the weighing operation. The letter or other article to be weighed is slipped between the spring clips 21 which will grip it so that it will be suspended from the strip 17. The spring 16 will oppose movement downwardly of the strip 17 but the weight of the letter will cause it to move. The calibrations 19 on the strip in cooperation with the point 20 at the extreme lower end of the housing 1, will indicate the weight of the letter. The stop 17a prevents pulling of calibrated strip 17 completely out of the lower end of housing 1.

It will be understood from the above description that I have provided a pocket letter scale having many desirable features not possessed by prior art scales. This device has the appearance of a fountain pen or a pencil and may be conveniently carried in the pocket. It is attractive in appearance. My pocket scale is of very simple construction, has a minimum number of parts, can be manufactured at a low cost and can be easily assembled or disassembled. The resistance of the spring of this scale may be readily varied so that the initial resistance of the spring may be accurately adjusted. Also, it is possible to adjust the calibrated rod upwardly or downwardly so that the zero mark thereon will always be, when no weight is applied to the scale, at the extreme lower edge of the housing. The operating mechanism of the scale is completely enclosed and is fully protected.

Although this scale has been described with reference to the weighing of letters, it is obvious that it may be employed for weighing various small articles.

Having thus described my invention, what I claim is:

1. A weighing scale of the type described comprising a substantially cylindrical housing having its upper end open and its lower end substantially closed but having a small angular opening in said lower end, a washer disposed in the upper open end of said housing, a screw extending through said washer and having a knob on its upper end which rests on said washer and projects up above the upper end of said housing, a cap having a reduced portion which is threaded into the extreme upper end of said housing above said washer, said cap having a chamber therein for receiving and enclosing the knob on the upper end of said screw and normally contacting with the screw to prevent rotation thereof, the lower end of said screw being threaded and having a nut threaded thereon, said nut having ears projecting therefrom at diametrically opposed points, a tension spring which has its upper end surrounding said last named collar in such a manner that the ears on the collar project between convolutions thereof, a strip suspended from the lower end of said spring and projecting through the opening in the lower end of said housing, said strip being calibrated, said strip also being of angular cross section so that it will not rotate in the opening but being free to slide therethrough, said strip and said opening being of such shape that the strip will contact with only a portion of the walls of the opening, a spring clip connected to the lower end of said rod and adapted to receive a letter or the like therebetween and to automatically grip it, and a cap member of substantially cylindrical form threaded onto the lower end of said housing and enclosing said spring clip and the portion of the calibrated strip which projects from said housing.

2. A weighing scale of the type described comprising a hollow casing having its upper end open and its lower end substantially closed but having a small angular opening in said lower end, a washer disposed in the upper open end of said casing, a screw extending through said washer and having a knob on its upper end which rests on said washer, a cap removably mounted on the upper end of said casing, said cap having a chamber therein for receiving and enclosing the knob on the upper end of said screw, the lower end of said screw being threaded and having a nut threaded thereon which carries a member that projects outwardly therefrom, a tension spring disposed in said casing and having its upper end surrounding said nut with said projecting member on the nut extending between convolutions thereof, a calibrated strip suspended from the lower end of said spring and projecting through the angular opening in the lower end of said casing, said strip being of angular cross section so that it will not rotate in the opening but being free to slide therethrough, means on the lower end of said strip adapted to grip a letter or the like, and a cap member removably mounted on the lower end of said casing and enclosing said gripping member.

3. A weighing scale of the type described comprising a hollow casing, a screw disposed within said casing and projecting through a member adjacent the upper end thereof, a cap removably mounted on the upper end of said casing for normally preventing access to the upper end of said screw, the lower end of said screw being threaded and having a nut threaded thereon which carries a member that projects outwardly therefrom, a tension spring disposed in said casing and having its upper end surrounding said nut with said projecting member on the nut extending between convolutions thereof, a calibrated strip suspended from the lower end of said spring and projecting through an angular opening in the lower end of said casing, said strip being of angular cross section so that it will not rotate in the opening but being free to slide therethrough, and means on the lower end of said strip adapted to grip a letter or the like.

4. A weighing scale of the type described comprising a hollow casing, a screw disposed within said casing and projecting through a member adjacent the upper end thereof, a cap removably mounted on the upper end of said casing for normally preventing access to the upper end of said screw, said cap when mounted properly on said casing contacting with the upper end of said screw so as to normally prevent turning of the screw, the lower end of said screw being threaded and having a nut threaded thereon which carries an outwardly projecting portion, a tension spring disposed in said casing and having its upper end surrounding said nut with said projecting portion on the nut extending between convolutions thereof, a member suspended from the lower end of said spring, and means on the lower end of said member for suspending the article to be weighed therefrom.

WILLIAM A. SCHEURER.